United States Patent Office 2,830,982
Patented Apr. 15, 1958

2,830,982

WATER-SOLUBLE SALT OF ERYTHROMYCIN

Charles A. Stainbrook and Charles E. Hoffhine, Waukegan, Ill., assignors to Abbott Laboratories, North Chicago, Ill., a corporation of Illinois No Drawing. Application June 3, 1955
Serial No. 513,167

1 Claim. (Cl. 260—210)

This invention relates to a novel salt of erythromycin and to a method for making it. More particularly, the invention relates to erythromycin sulfamate and to a method for making it.

Erythromycin is a highly useful antibiotic obtained by the action of *Streptomyces erythreus* on a nutritive culture medium. It is a basic compound which can be isolated in relatively pure form as a white solid. The antibiotic is described in detail in Bunch et al. U. S. Patent No. 2,653,899.

Erythromycin base is substantially insoluble in water at ordinary temperatures, the solubility being about 1–2 mg./cc. This relative insolubility of erythromycin limits the usefulness of the base because aqueous solutions thereof do not contain a high enough proportion of erythromycin to provide effective dossage in manageable volumes of water.

It is a principal object of this invention to provide a salt of erythromycin which will be reasonably soluble in water.

In the accomplishment of the foregoing object and in accordance with the practice of this invention, there is now provided a new composition of matter, erythromycin sulfamate, which is the reaction product of approximately equivalent amounts of erythromycin base and sulfamic acid. The new composition of matter is a white solid which has the interesting characteristics of being soluble in water in amounts up to about 30 mg./cc. and at the same time is insoluble in amyl acetate. The new composition of matter has erythromycin activity on the order of about 825 units per mg. when in substantially pure form. In common with other antibiotic compositions, erythromycin sulfamate does not have a well-defined melting point.

The following examples are given in order to provide a disclosure of the invention in full detail but the examples are not intended to be a limitation on the invention.

*Example I*

130 ml. of a filtered amyl acetate extract of a fermentation beer containing erythromycin base was assayed and found to have approximately 7,000 units of erythromycin activity per ml. On the basis of this activity it is calculated that 120 mg. of sulfamic acid will be an approximate equivalent amount. 120 mg. of sulfamic acid is dissolved in 0.6 ml. of water and diluted with 2.4 ml. of ethanol (3A absolute). The solution of sulfamic acid is added dropwise to the stirred amyl acetate extract containing erythromycin base. When dropwise addition has been completed, the mixture is stirred for approximately 15 minutes more and the precipitated erythromycin sulfamate is removed by filtration, washed with acetone and dried. 1.10 grams of a nearly white, powdery solid is obtained and is found to have 824 units of erythromycin activity per mg. The recovery of the original erythromycin activity is approximately 99.5%.

In other runs employing amyl acetate extract of an erythromycin-containing beer, the method outlined above was followed. Recoveries of from 86.5% to quantitative were obtained.

*Example II*

A sample of erythromycin base weighing 1.00 grams and assaying 870 units of erythromycin activity per mg. is dissolved in 100 ml. of amyl acetate. An equivalent amount (130 mg.) of sulfamic acid is dissolved in 1.3 ml. of water and 8.7 ml. of ethanol. The solution of sulfamic acid is added dropwise to the stirred solution of erythromycin base in amyl acetate. A granular white precipitate of erythromycin sulfamate is formed and is removed by filtration, followed by washing with acetone and drying. 1.05 grams of product is obtained and is found to have an erythromycin activity of 825 units per mg. Again, the recovery of erythromycin is almost quantitative.

In the foregoing examples it will be seen that approximately equivalent amounts of erythromycin base and sulfamic acid ($HSO_3NH_2$) were employed. The reaction proceeds well at room temperature but one skilled in the art will recognize that it could be conducted at higher or lower temperatures as desired with substantially equivalent results.

One skilled in the art will recognize that the reaction involved herein is between the erythromycin (+) ion and the sulfamate (−) ion in whatever form these ions can be conveniently supplied. Salts of sulfamic acid, and particularly the alkali metal and alkaline earth metal salts thereof (sodium, potassium, calcium, magnesium, etc.) are suitable, and the erythromycin may be present in the form of salts thereof such as the mineral acid salts (hydrochloride, sulfate, etc.) and the salts of fatty acids (stearate, oleate, etc.) and sugar acid (lactobionate, gluconate, glucoheptonate, etc.).

Erythromycin sulfamate exhibits the characteristic antibacterial spectrum of erythromycin base and may be used in combatting the gram positive infections such as staphlococcal and streptococcal infections in the same general way that erythromycin base is used. In addition, erythromycin sulfamate is a useful intermediate in the preparation of other important forms of erythromycin such as erythromycin base, and insoluble salts of erythromycin such as erythromycin stearate.

In the preparation of erythromycin base from erythromycin sulfamate one suitable method consists in dissolving erythromycin sulfamate in a solvent such as methanol and adding water to said solution with mixing. A solution of a basic compound such as sodium carbonate is then added to the erythromycin sulfamate solution, preferably warm or hot. Erythromycin base precipitates from the solution and is filtered therefrom. The base is washed with water and dried thoroughly. Recoveries of erythromycin base in the range of 90% to quantitative are obtained by the foregoing procedure.

Erythromycin base may be converted to erythromycin stearate by dissolving the base in a solvent therefore such as acetone, filtering off any residuary insoluble material, and adding an equivalent amount of stearic acid to the filtrate and heating to about 50° C. until a clear solution is obtained. Water at about 60° C. is then added with thorough mixing until a faint cloudiness is observed after which the mixture is allowed to cool to room temperature. Crystallization is complete in about two hours and the precipitate is filtered off and washed with water and then dried thoroughly. Substantially pure erythromycin stearate is obtained having an erythromycin activity on the order of about 690 units per mg. and recovery is substantially quantitative. The erythromycin stearate product thus obtained is quite insoluble in water and is suitable for use in tablet preparations as well as in liquid preparations such as flavored suspensions.

The dry powdered erythromycin sulfamate may be employed in powder, granule or tabletted form, along with the usual excipients, fillers and carriers. It is also suitable for compounding into a water-soluble product for addition to drinking water or to oral flavored products. One such preparation suitable for use in the treatment of poultry by addition either to solid feed or to drinking water comprises:

| | Grams |
|---|---|
| Erythromycin sulfamate (77% active, giving 21.1 g. of erythromycin activity) | 27.40 |
| Sodium citrate | 90.80 |
| Oil of cinnamon | 1.82 |
| Bright orange dye | 1.82 |
| Dupanol P. C. | 4.54 |
| Sucrose | 227 |

The amount of erythromycin activity is adjusted so that a dose of approximately 50–55 units of erythromycin activity per cc. of drinking water is obtained when said solid composition is dissolved in water. An amount of said composition is added to a dry powdery feed which is calculated to give an effective dose of erythromycin activity in the amount of feed normally consumed by one fowl in one day's feeding. In both feed and drinking water the amount of material added is adjusted so as to provide between about 5 mg./kg. and 250 mg./kg., and preferably about 25–50 mg./kg., of erythromycin activity in the amount of food or water that the average fowl will take in one day. As a specific example, young chickens averaging 160 g. in weight took an average of about 30 cc. of the medicated water per day which provided about 1.5 mg. of erythromycin activity, or about 10 mg./kg. of body weight. The sodium citrate in this composition acts as a buffer to maintain a pH between about 6 and 8 in the drinking water.

Others may practice this invention in any of the numerous ways which will be suggested to one skilled in the art upon a reading of this disclosure. All such practice of the invention is intended to be covered hereby provided it falls within the scope of the appended claim.

We claim:

A new composition of matter, erythromycin sulfamate.

References Cited in the file of this patent

UNITED STATES PATENTS 2,653,899     Bunch et al.     Sept. 29, 1953